(12) United States Patent
Wang et al.

(10) Patent No.: US 10,464,282 B2
(45) Date of Patent: Nov. 5, 2019

(54) SYSTEMS AND PROCESSES FOR JOINING WORKPIECES ROBUSTLY USING MOGULS AND ADHESIVE

(71) Applicant: GM GLOBAL TECHNOLOGY OPERATIONS LLC, Detroit, MI (US)

(72) Inventors: Pei-chung Wang, Troy, MI (US); Susan M. Smyth, Rochester Hills, MI (US); Bhavesh Shah, Troy, MI (US); Bradley J. Blaski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 15/395,978

(22) Filed: Dec. 30, 2016

(65) Prior Publication Data

US 2017/0210087 A1 Jul. 27, 2017

Related U.S. Application Data

(60) Provisional application No. 62/281,597, filed on Jan. 21, 2016.

(51) Int. Cl.
*B23B 3/30* (2006.01)
*F16B 17/00* (2006.01)
*B32B 7/14* (2006.01)
*B32B 3/30* (2006.01)
*F16B 11/00* (2006.01)
(Continued)

(52) U.S. Cl.
CPC ............... *B32B 3/30* (2013.01); *B23K 20/10* (2013.01); *B32B 7/12* (2013.01); *B32B 7/14* (2013.01); *B32B 37/12* (2013.01); *F16B 5/07* (2013.01); *F16B 5/08* (2013.01); *F16B 11/006* (2013.01);
(Continued)

(58) Field of Classification Search
CPC ..... B29C 66/302–3024; B29C 66/303–30326; B29C 66/40–452; B29C 65/08–088; B29C 65/58–645; B32B 7/08; B32B 7/12; B32B 7/14; B32B 3/26; B32B 3/263; B32B 3/30
See application file for complete search history.

(56) References Cited

U.S. PATENT DOCUMENTS 3,765,973 A * 10/1973 Kramer ............... B29C 37/0082
156/73.1
5,641,140 A * 6/1997 Sorenson ............... A47B 13/16
248/205.3
(Continued)

FOREIGN PATENT DOCUMENTS

WO WO 2014025076 A1 * 2/2014 ............. H01L 41/37
WO WO 2015041844 A1 * 3/2015 ............... B32B 7/12

*Primary Examiner* — Z. Jim Yang (57) ABSTRACT

An adhesive-bonded component including a first workpiece having a first substrate and a first mating surface including a plurality of protrusions. The component also includes a second workpiece comprising a second substrate having a second mating surface contacting the first mating surface and adhesive positioned on the first mating surface. In various embodiments, the second mating surface comprises troughs receiving the protrusions of the first workpiece, and the plurality of protrusions of the first workpiece and the troughs of the second workpiece may be arranged in multiple mating patterns. The technology also includes processes of making the components.

14 Claims, 7 Drawing Sheets

(51) Int. Cl.
  *B23K 20/10* (2006.01)
  *F16B 5/08* (2006.01)
  *F16B 5/07* (2006.01)
  *B32B 7/12* (2006.01)
  *B32B 37/12* (2006.01)

(52) U.S. Cl.
  CPC ....... *F16B 17/00* (2013.01); *Y10T 428/24521* (2015.01); *Y10T 428/24537* (2015.01)

(56) References Cited

U.S. PATENT DOCUMENTS

| | | | | |
|---|---|---|---|---|
| 6,406,636 | B1* | 6/2002 | Vaganov | B23K 1/0016 216/2 |
| 6,638,383 | B2* | 10/2003 | Tarnawskyj | B29C 65/56 156/157 |
| 7,105,594 | B2* | 9/2006 | Tarnawskyj | B29C 65/56 524/495 |
| 8,905,104 | B2* | 12/2014 | Raffles | B23Q 3/084 156/247 |
| 9,358,944 | B1* | 6/2016 | Aselage | B60R 21/04 |
| 2002/0088526 | A1* | 7/2002 | Lee | B01D 1/06 156/73.1 |
| 2003/0219602 | A1* | 11/2003 | Kagan | B29C 65/08 428/411.1 |
| 2005/0276985 | A1* | 12/2005 | Muggli | B32B 3/26 428/421 |
| 2006/0249241 | A1* | 11/2006 | Uchida | B29C 65/08 156/73.1 |
| 2007/0181740 | A1* | 8/2007 | Sogabe | G11B 23/037 242/608.8 |
| 2007/0261224 | A1* | 11/2007 | McLeod | B29C 37/0053 29/428 |
| 2008/0169685 | A1* | 7/2008 | Hedderly | B62D 27/023 296/203.01 |
| 2009/0056865 | A1* | 3/2009 | Kubota | B29C 35/02 156/247 |
| 2010/0068464 | A1* | 3/2010 | Meyer | B23K 15/0086 428/161 |
| 2010/0079970 | A1* | 4/2010 | Prest | B29C 65/645 361/807 |
| 2010/0162508 | A1* | 7/2010 | Olhe | A47L 13/16 15/229.11 |
| 2010/0173161 | A1* | 7/2010 | Beehag | B29C 65/0627 428/411.1 |
| 2010/0316845 | A1* | 12/2010 | Rule | B29C 61/0608 428/172 |
| 2012/0011692 | A1* | 1/2012 | Kruglick | H05B 6/105 29/426.5 |
| 2012/0040129 | A1* | 2/2012 | Tseng | B32B 27/06 428/99 |
| 2012/0258328 | A1* | 10/2012 | Carlson | B21J 15/025 428/583 |
| 2013/0149501 | A1* | 6/2013 | Pacchione | B29C 66/73751 428/172 |
| 2013/0209163 | A1* | 8/2013 | Victorazzo | B29C 65/5057 403/267 |
| 2014/0044926 | A1* | 2/2014 | Twork | B32B 27/08 428/167 |
| 2014/0134379 | A1* | 5/2014 | Harrison | B32B 3/06 428/58 |
| 2014/0190638 | A1* | 7/2014 | Hull | B65B 51/225 156/580.2 |
| 2014/0356053 | A1* | 12/2014 | Urayama | B29C 66/73921 403/270 |
| 2015/0072106 | A1* | 3/2015 | Ezzat | B32B 7/04 428/119 |
| 2015/0174873 | A1* | 6/2015 | Shin | H01L 41/37 428/163 |
| 2015/0183155 | A1* | 7/2015 | Saito | B29C 65/1677 210/483 |
| 2015/0183183 | A1* | 7/2015 | Takano | B32B 3/30 428/178 |
| 2015/0192446 | A1* | 7/2015 | Arai | G01F 15/14 73/273 |
| 2015/0260208 | A1* | 9/2015 | Baker | B21J 15/147 403/282 |
| 2015/0290873 | A1* | 10/2015 | Hull | B29C 66/43 156/580.2 |
| 2015/0300389 | A1* | 10/2015 | Mayer | B29C 65/08 156/73.1 |
| 2016/0053788 | A1* | 2/2016 | Iwano | B29C 65/70 403/268 |
| 2016/0167353 | A1* | 6/2016 | Fan | B32B 15/08 216/39 |
| 2016/0221256 | A1* | 8/2016 | Rule | B32B 7/12 |
| 2016/0272295 | A1* | 9/2016 | Benthien | B32B 3/26 |
| 2016/0297138 | A1* | 10/2016 | De Traglia Amancio Filho | B29C 65/08 |
| 2016/0297140 | A1* | 10/2016 | Stefanziosa | B29C 65/4815 |
| 2016/0341234 | A1* | 11/2016 | Germann | B21J 15/147 |
| 2016/0347029 | A1* | 12/2016 | Roemer | B32B 3/263 |
| 2017/0057155 | A1* | 3/2017 | Barnes | B29C 65/08 |
| 2017/0129208 | A1* | 5/2017 | Yang | C09J 11/04 |
| 2017/0165739 | A1* | 6/2017 | Wang | B21J 15/025 |
| 2017/0321738 | A1* | 11/2017 | Campbell | B32B 38/0036 |
| 2018/0036958 | A1* | 2/2018 | Ueno | B29C 65/1638 |
| 2018/0093346 | A1* | 4/2018 | Yamagishi | B29C 65/1635 |
| 2018/0111325 | A1* | 4/2018 | Mayer | B29C 65/08 |
| 2018/0215105 | A1* | 8/2018 | Mayer | B29C 65/08 |

* cited by examiner

Fig_8

Fig_9

SYSTEMS AND PROCESSES FOR JOINING WORKPIECES ROBUSTLY USING MOGULS AND ADHESIVE

TECHNICAL FIELD

The present technology relates generally to systems and processes for joining parts or workpieces and, more specifically, for joining workpieces robustly using moguls, or strategically disposed protrusions, in combination with adhesive. The workpieces can have the same or similar material, such as by each including a polymer, each including a metal, and one including polymer and one including metal.

BACKGROUND OF THE DISCLOSURE

Welding is a common way to join similar and dissimilar materials in a wide range of industries, including consumer electronics, home products and appliances, farming, construction equipment, transportation systems, and the like.

The dissimilar materials can include a dissimilar metals, dissimilar polymers, or combinations of polymers and metals. The manufacturer can select favorable characteristics, such as being lightweight, highly-conformable or shapeable, strong, durable, or having a desired texture or color by combining some polymer or composite materials with other materials. An article of manufacture may include various components (exterior, interior, or decorative features) where materials are selected and configured to withstand a hot and/or chemically aggressive environment or for painting or chemical resistance over time.

Processes for joining similar or dissimilar materials include mechanical joining (e.g., bolts and rivets), fusion joining (e.g., fusion arc welding and laser welding), solid-state joining (e.g., friction-stir welding and ultrasonic welding), brazing or soldering, and adhesive bonding, among others.

Joining materials robustly and without great expense is a challenge. Considerations include chemical, mechanical, and thermal behaviors of materials being joined. Adhesive bonding presents many benefits including being relatively cost effective and non-intrusive.

Figure 1:
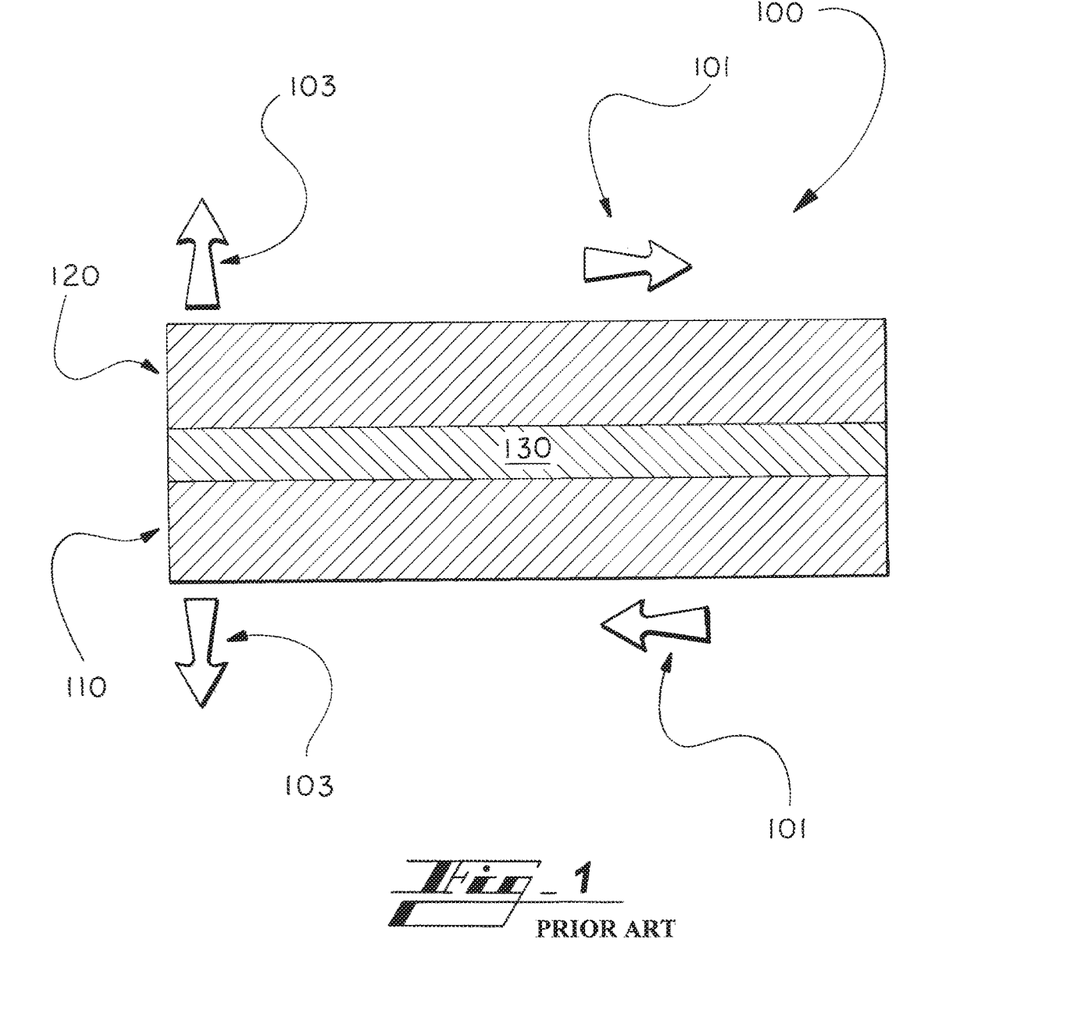
FIG. 1 illustrates a side cross section of a conventional adhesive-bonded joint.

Conventional adhesive-bonding techniques involve applying adhesive between two usually smooth surfaces. Turning to the figures, and more particularly to the first figure, FIG. 1 illustrates a conventional adhesive-bonded system 100. The system 100 includes a first workpiece 110 joined to a second workpiece 120 by an adhesive 130.

In some cases, a surface is polished or scored on a micro-scale, such as to remove surface contamination and/or add roughness.

Conventional techniques have shortcomings. While conventional adhesively bonded joints have relatively strong shear strength, keeping the respective workpieces from moving laterally (or parallel) with respect to each other, they tend to have relatively weak peel strengths. Example shear forces are indicated by arrows 101 in FIG. 1.

Adhesive does not generally do well alone at countering non-lateral forces, such as peel or pull forces. Example peel forces are indicated by arrows 103 in FIG. 1. Peel forces tend to pull the workpieces away from each other. In operation, cracks form in the adhesive of the joint and propagate through the adhesive, such as generally laterally, without obstacle, weakening the joint 100.

Figure 6:
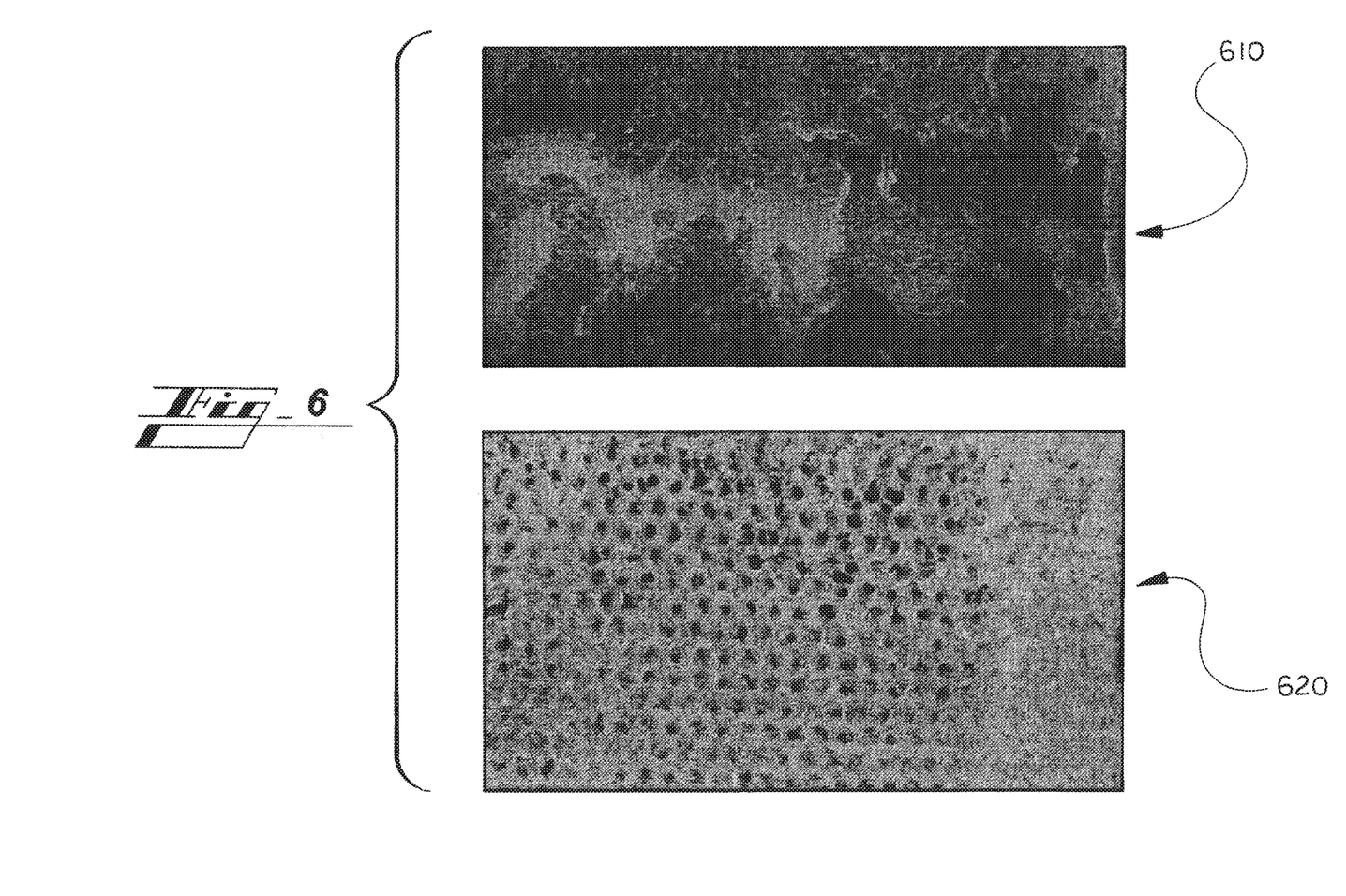
FIG. 6 shows fractographic images illustrating effects of the present technology.

With further reference to the figures, FIG. 6 shows the fracture surfaces of an example joint 610. The joint 610 corresponds to a conventional system like the system 100 of FIG. 1. Lines shown in the joint 610 represent cracks that have propagated through the adhesive in response to peel force input.

Designers have tried to solve the aforementioned shortcomings by adding mechanical fasteners such as rivets. This is accompanied by ancillary shortcomings, though, such as added cost, product weight, and potential for later galvanic corrosion.

While adhesive bonds can be strong, depending mostly on the adhesive used, stronger adhesive-based bonds are desired and now possible.

SUMMARY OF THE DISCLOSURE

Need exist, due to the aforementioned deficiencies, for processes and systems for adhesive bonding workpieces together robustly, efficiently, and cost-effectively.

In one aspect, the process involves forming moguls or protrusions on a mating surface of one of two workpieces to be joined, and applying adhesive between the workpieces. The adhesive becomes disposed on and/or between the protrusions. The process also includes mating the workpieces with the adhesive between them. The resulting joint is notably stronger than joints formed between similar sized workpieces not having protrusions.

In another aspect, the process involves forming moguls or protrusions on respective mating surfaces of both of two workpieces to be joined, applying adhesive between the workpieces, wherein the adhesive becomes disposed between the protrusions of both workpieces, and mating the workpieces with the adhesive between them. The mating is performed so that protrusions of one of the workpieces become disposed on and/or between protrusions of the other workpiece. Joints formed in this way are also notably stronger than joints formed between similar-sized workpieces not having protrusions.

The protrusions can have various shapes, such as by being domed, having a depression in the protrusion, or having a wider tip, head, or bulb.

Some processes include providing protrusions and/or troughs on and/or in one or both of two substrates being joined.

Processes can be used in more than just adhesion bonding, and the teachings herein may be extended to other types of bonding. In addition to the mechanical connecting provided by the protrusions and/or tough, the process can include one or more additional methods, such as adhesion by adhesive, or a hybrid technique, such as adhesion/weld bonding, adhesion/rivet bonding, or weld/rivet bonding.

Other aspects of the present technology will be in part apparent and in part pointed out hereinafter.

The figures are not necessarily to scale and some features may be exaggerated or minimized, such as to show details of particular components. In some instances, well-known components, systems, materials or methods have not been described in detail in order to avoid obscuring the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be vertically upward, or atop, in a design, manufacturing, or operating reference frame, or above any other particular component, and can be aside of some or all components in design, manufacture and/or operation instead, depending on the orientation used in the particular implementation. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

The joints formed by the present technology may be used in any of a wide variety of products and industries. The joints may be used in manufacturing transportation vehicles, for instance, such as automobiles, aircraft, watercraft, trucks, busses, trolleys, and trains, or commercial or manufacturing equipment, construction machines, agricultural machinery, warehouse equipment, office equipment, home appliances, computing devices, such as phones, wearables, the like, and other.

I. First Example Workpieces—FIGS. 2 and 9

Figure 2:
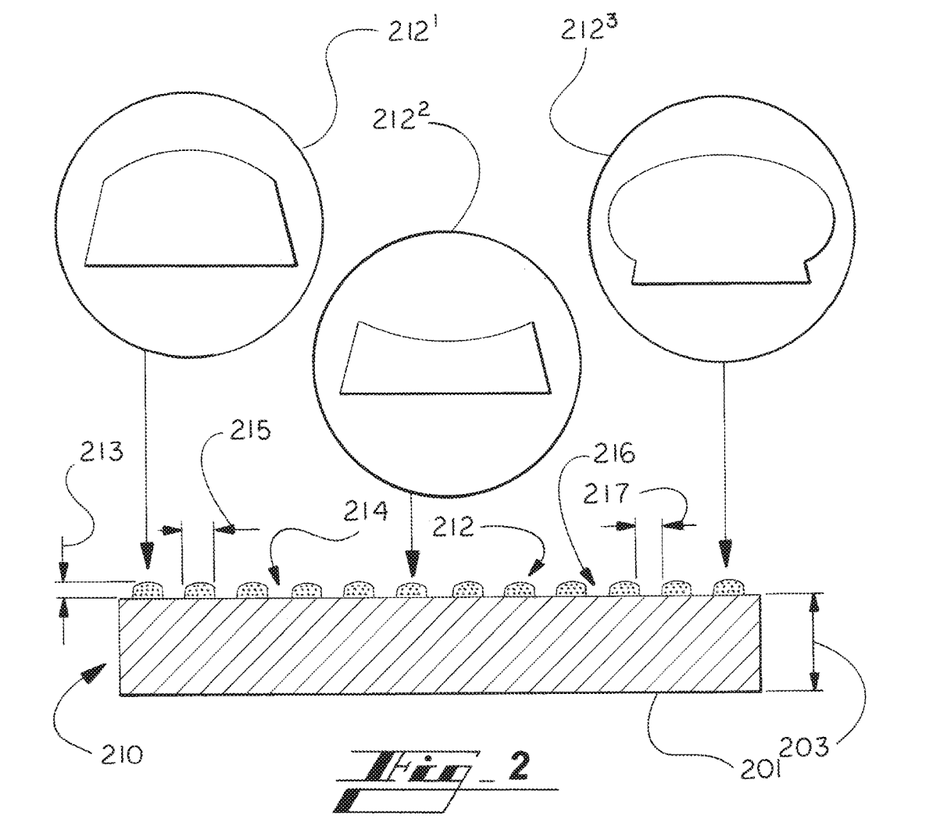
FIG. 2 illustrates a side cross section of an example first workpiece, and alternative protrusion shapes therefor, according to the present technology.

Turning again to the figures, FIG. 2 shows an example base workpiece 210 formed with multiple moguls or protrusions 212. The protrusions 212 form or define valleys or interstices 214.

The protrusions extend from a substrate or base 201. The protrusions 212 are formed together with the substrate 201, yielding a unitary workpiece, in various embodiments, or are connected to the substrate 201. The substrate 201 may include any suitable material and be used in any suitable manner of forming the substrate 201 and the protrusions 212.

The protrusions 212 can be formed in a variety of ways, such as in molding the workpiece 210 or by removing material between (214) what becomes the protrusions 212. Molding can include compression molding, injection molding, or resin transfer molding (RTM), for example. The protrusions are added to a separately formed substrate 201, as mentioned, such as by adhesion, melding, or welding.

The substrate 201 and protrusions 212 can include any of a wide variety of materials without departing from the scope of the present technology. The substrate 210 may have the same material composition as the protrusions 212 or a different material composition.

The substrates and protrusions of the workpieces described herein can both include polymer, both include metal, one include polymer and one include metal, or one or both of them can include metal and a polymer.

Polymeric materials may include, for instance, a polymeric composite, such as a cross-tension carbon-fiber composite.

Figure 9:
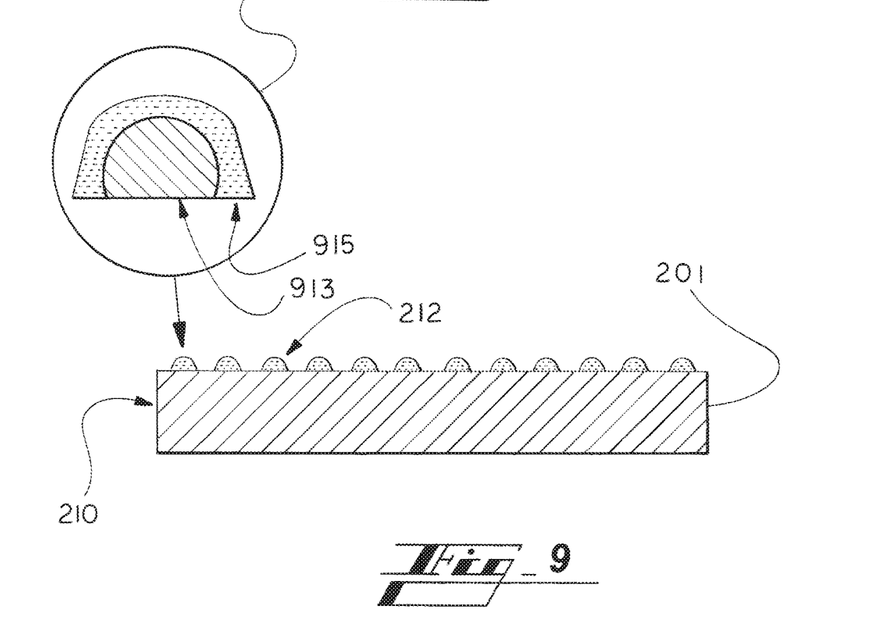
FIG. 9 illustrates a side cross section of an example first workpiece, like that of FIG. 2, showing an alternative protrusion configuration.

FIG. 9 illustrates a side cross section of an example first workpiece, like that of FIG. 2, showing an alternative protrusion configuration. The protrusions 212 can be formed to include an insert or energy director 913, as shown in the call-out $212^4$. The insert 913 is, in various embodiments, positioned in a molding apparatus for positioning on the substrate 201 before, during, or after a molding process for the substrate 201.

While the insert 913 is shown to have a shape corresponding to a shape of the protrusion $212^4$, or vice versa, the insert and protrusion can have different shapes. For protrusions $212^4$ having other shapes, such as those indicated in FIG. 2 ($212^1$, $212^2$, $212^3$), the insert 913 can have a similar shape as the protrusion.

The insert 913 can include any of a variety of materials without departing from the scope of the present technology. The insert 913 in various embodiments includes a different material than the substrate 201. The insert 913 in various embodiments includes a different material than a balance 915 of the protrusion 212. The insert 913 can include a metal, such as aluminum.

In a contemplated embodiment, in which welding is used in combination with adhesion for joining the workpieces 210, 220, the insert 913 can act as an energy director, focusing welding energy, such as ultrasonic welding energy from a welding horn.

As mentioned, the processes—including providing protrusions and/or troughs on/in one or both of two substrates being joined, as described herein—can be used in more than just adhesion bonding implementations. In some instances the teachings can be extended to other types of bonding or joint forming. In addition to the mechanical connecting provided by the protrusions and/or tough, the process can include one or more additional methods, such as adhesion by adhesive, or a hybrid technique, such as adhesion/weld bonding, adhesion/rivet bonding, or weld/rivet bonding.

The protrusions 212 and interstices 214 can have any of a wide variety of sizes and shapes without departing from the scope of the present technology. The insert 913 can be shaped as a pin, for instance, or like the outline shape of the protrusions 212 shown in FIG. 2 or 9.

In a various embodiments, the size of the protrusions 212 is pre-determined based on any one or more of various factors. Example factors include material and a thickness 203 (FIG. 2) of the substrates 201 at which or on which the protrusions 212 are formed or provided.

In various embodiments, there is a relationship between the thickness 203 of the substrate 201 and the height(s) of the protrusions 212. In one embodiments, for instance, thicker substrates 201 call for taller protrusions 212.

In some embodiments, substrates 201 comprising stronger material(s), such as metals (e.g., aluminum or steel) are made thinner than if the substrate 201 was made of weaker material(s). A designer in such cases may select shorter protrusions 212—whether made of the same, stronger, or weaker material vis-à-vis the substrate 201—as compared to protrusion heights that may be used with a softer substrate 201, such as carbon fiber composites.

While the protrusions 212 can each have a common or various heights 213, such as if it is tiered, a maximum height is referred to primarily herein for simplicity. And while the substrate can each have one or multiple thicknesses 203, a maximum thickness or primary thickness 203 at the joint formed can be referred to primarily herein for simplicity. Similarly, while the adhesive 430 (FIGS. 4 and 8) can each have multiple thicknesses 432, such as at different places across the substrate, such as due to presence of the protrusions 212, a maximum thickness 432 is referred to primarily herein for simplicity.

In some embodiments, the bond line 430 has generally the same thickness 432 (FIG. 4) as the height 213 (FIG. 2) of the protrusions 212. The bond line thickness 432 and protrusion height 213 can be different from each other, and be calculated separately based on various contextual data. In various embodiments, a designer of the arrangement may create the joint according to any suitable relationships between two or more of protrusion heights 213, substrate thickness 203, bond line thickness 430, protrusion material(s), and substrate material(s), such as the following.

Figure 4:
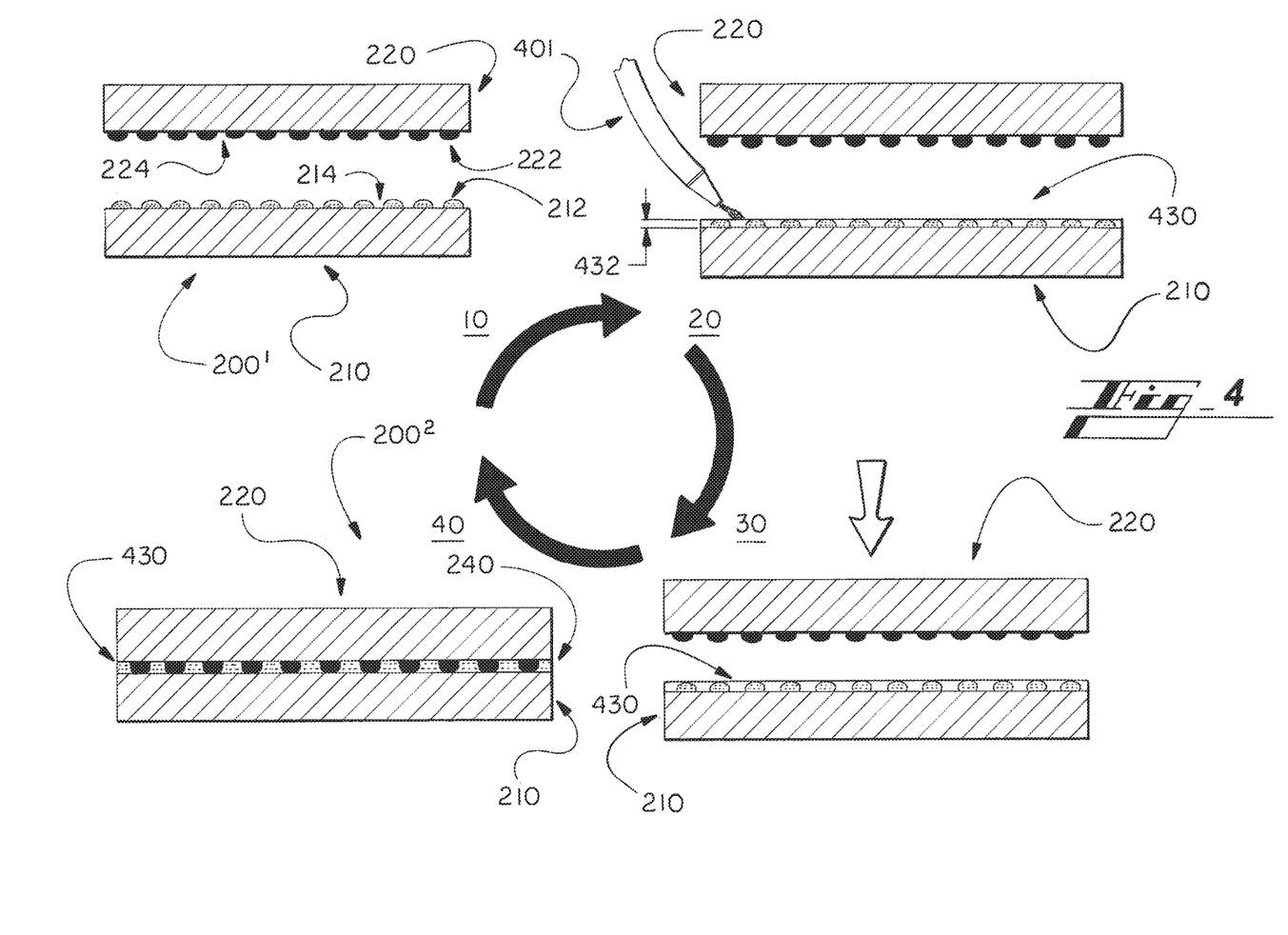
FIG. 4 illustrates stages of an example process of adhesively bonding specially configured workpieces.

In one example, a substrate 201 comprises a carbon fiber or other polymer composite, and has a thickness 203 of between about 1.5 mm and about 5 mm, and each protrusion 212/bond line 430 has a height 213/432 of between about 0.5 mm and about 0.75 mm.

As other example, a substrate 201 comprises a metal (e.g., aluminum) and has a thickness 203 of between about 0.6 mm and about 2 mm, each protrusion 212/bond line 430 has a height 213/432 of between about 0.2 mm and bout 0.3 mm.

Protrusion 212/bond line 430 height 213/432 can be represented by any of multiple ratios or percentages. As can be gleaned from the above example heights 213/432 and thicknesses 203 for carbon fiber or other polymer composites substrates 201, ratios or percentages can include the protrusion 212/bond line 430 height 213/432 being between about 15% and about 50% of the substrate thickness 203.

As can also be taken from the above example protrusion 212/bond line 430 height 213/432 and substrate thicknesses 203 for metal (e.g., aluminum) substrates, ratios or percentages can include the protrusion 212/bond line 430 height 213/432 being between 10% and about 50% of the metal substrate thickness 203.

Though metal substrates and their protrusions can tend to be smaller according to various implementations of the present technology, the ratios or percentages of protrusion height and/or bond line thickness to substrate thickness (e.g., 10-50%) can be generally the same as those for the polymer substrates (e.g., 15-50%).

A designer based on the mentioned contextual data and/or other data can find other ratio, percentage, or range of ratios or percentages to be preferred. The other ratios, percentages, or range thereof can include or be within the examples provided, overlap with the examples provided, or even be above or beyond the examples provided.

In various implementations, using a protrusion height 213 and/or bond line thickness 432 outside of a pre-determined preferred ratio, percentages, or range, would result in the resulting joint being weaker than if the preferred ratio, percentage, or range were used. For instance, though thicker bond lines promote formation of stronger joints, as shown by comparing the 0.25 mm and 0.5 mm bond line cases in scenarios 530, 540, 550 of FIG. 5, there is a point at which thickening the bond line does not add strength.

While the protrusions 212 can have any suitable width, and the width may vary at any one protrusion, or from protrusion to protrusion, in various embodiment each protrusion 212 has a width (e.g., maximum width) 215 of between about 0.2 mm and about 2 mm.

The interstices 214 in various embodiments have a primary workpiece surface 216 as a bottom.

Three example protrusion shapes are shown in FIG. 2. The first protrusion shape $212^1$ can be referred to as a basic dome shape.

The second protrusion shape $212^2$ can be referred to as a recessed or partially hollowed protrusion.

The third protrusion shape $212^3$ can be referred to as a bulb protrusion.

In various contemplated embodiments, the protrusions 212 do not all have the same shape. For instance, one or more can have the first style $212^1$, one or more the second style $212^2$, and one or more the third $212^3$.

Protrusion shape can be dictated by various contextual factors, such as effectiveness in forming a robust, strong joint, and feasibility (ability, cost, time investment, etc.) of forming the shape.

The interstices 214 have shapes dependent at least in part on a shape(s) of the protrusions 212.

While the interstices 214 can have other widths (e.g., maximum width) 217, in various embodiments each one of the interstices 214 has a width 217 of between about 0.2 mm and about 2.0 mm.

II. Second Example Workpieces—FIG. 3

Figure 3:
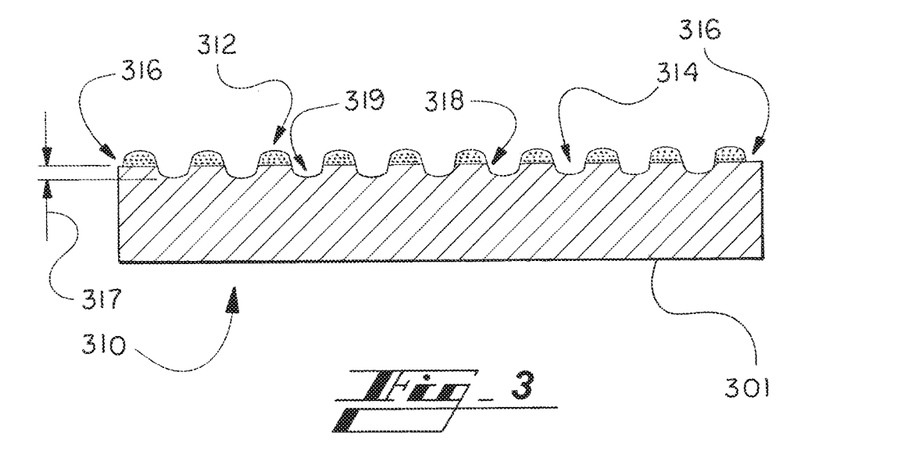
FIG. 3 illustrates a side cross section of another example first workpiece according to the present technology.

FIG. 3 shows another example base workpiece 210 formed with multiple moguls or protrusions 312. The protrusions 312 form or define valleys or interstices 314.

In the embodiment of FIG. 3, the interstices 314 include, extending below a primary surface 316 of the substrate 301, a plurality of troughs 318.

The troughs 318 can be formed in a variety of ways, such as in molding the workpiece 310 or by removing material at the primary surface 316, in interstices 314 between protrusions 312. Again, molding can include compression or injection molding, for example. Material can be removed in any suitable manner, such as by melting or any of various machining techniques, such as etching, cutting, or shaving.

In a contemplated embodiment, the troughs 318 are formed by impressing or dimpling the surface of the substrate 201.

The protrusions 312 can have any desired shape, such as the shapes described herein in connection with FIG. 2 or 9. The protrusions 312 can also be sized like the protrusions 212 of FIG. 2 or 9.

The protrusions 312 and interstices 314 can be sized in any suitable manner, such as by the sizes described above in connection with the protrusions 212 and interstices 214 of FIG. 2.

While the troughs 318 can have other depths 317, measured between the primary substrate surface 316 and a bottom 319 of the trough 318 as shown in FIG. 3, in various embodiments each one of the troughs 318 has a depth 317 of between about 0.2 mm and about 0.3 mm.

Again, the interstices 314 have shapes dependent at least in part on a shape(s) of the protrusions 312.

III. Example Joint Formation—FIG. 4

FIG. 4 illustrates stages of an example process of adhesively bonding specially configured workpieces 210, 220.

At a first step, labeled 10 in FIG. 4, two workpieces 210, 220 are provided. These initial components 210, 220, alone or with the adhesive 430, are indicated generally by reference numeral $200^1$ in FIG. 4.

By way of example, each of the workpieces 210, 220 is similar to the workpiece 210 shown in FIG. 2.

The protrusions 212, 222 can have any shape or size, including but not limited to those shown and described above. The interstices 214, 224 can also have any shape or size, including but not limited to those shown and described above.

In one embodiment, one of the workpieces does not have any protrusions.

In a contemplated embodiment, one of the workpieces includes troughs, like the troughs 318 shown in FIG. 3, even if the same workpiece does not include any protrusions adjacent the troughs.

At a second step 20, adhesive 430 is introduced between the workpieces 210, 220. The adhesive 430 is introduced using any suitable tool 401. the adhesive 430 can be introduced in more than one place separately, by one or more tools, simultaneously or at different times. The adhesive 430 can be injected, sprayed or otherwise dispensed in two or more separate parts or sections, for instance.

The adhesive 430 can include any of a wide variety of materials without departing from the scope of the present technology. In various embodiments, the material is selected by a designer based on material of the substrates 201 and/or the protrusions 212, for optimal bonding, or for best bonding within other contextual factors such as cost, required joint strength for the application, and regulation.

The adhesive 430 is in various embodiments introduced at any one or more of: between protrusions 212 of the first workpiece 210, between protrusions 222 of the second workpiece 220, on protrusions 212 of the first workpiece 210, and on protrusions 222 of the second workpiece 220.

As with any step performed herein, introducing the adhesive 430 can be performed by automated machinery, such as robotic equipment.

The adhesive 430 can be introduced in any of a wide variety of amounts. The amount can be predetermined, and quantified in any of many ways, such as by volume or thickness of an adhesive layer formed. A layer or line of the adhesive 430 can be referred to as a bond line. While other amounts of adhesive 430 can be introduced, in various embodiments the adhesive is applied to form a layer having a thickness 432 between about 0.2 mm and about 0.75 mm. In some embodiments, the thickness 432 is either 0.25 mm or 0.5 mm.

In various embodiments, the thickness 432 is generally the same as the height of the protrusions 212 adjacent which the adhesive 430 is introduced. If a trough 318 is present, the thickness 432 in some implementations includes the depth of the trough 318 as well as a height of any adjacent protrusion 212.

At a third step 30, the workpieces 210, 220 are mated. Mating the workpieces 210, 220 can be performed in any of a variety of manners, such as by moving the first workpiece 210 toward the second workpiece 220 and/or by moving the second workpiece 220 toward the first workpiece 210.

For embodiments in which both workpieces 210, 220 include protrusions 212, 222, mating the workpieces 210, 220 can include positioning some of the protrusions of each workpiece 210, 220 into corresponding interstices 224, 214 of the other workpiece 220, 210. The interstices 224, 214 can be considered to correspond to the protrusions 212, 222 by being positioned opposite the protrusions 212, 222 during the mating step, for instance. The protrusions 212, 222 in various implementations assist this positioning, such as by sides of the protrusions 212 of the first workpiece 210 contacting sides of the protrusions 222 of the second workpiece 220 to guide the protrusions 212, 222 into the corresponding interstices 224, 214.

For embodiments in which at least the first workpieces 210 include protrusions 212, 222 and the second workpiece 220 includes a trough (like trough 318 of FIG. 3), mating the workpieces 210, 220 can include positioning some of the protrusions 212 of the first workpiece 210 into corresponding troughs of the second workpiece 220.

In a contemplated embodiment, force may be applied to hold the workpieces together temporarily after being connected, such as by clamp.

At the fourth step 40, after mating, the adhesive cures, hardens, or dries, forming the joint 240 connecting the workpieces 210, 220.

In contemplated embodiments, the curing is promoted actively, such as by adding heat to the arrangement.

Any temporary holdings components, such as clamp, are removed.

The resulting system is indicated by reference numeral $200^2$.

IV. Example Crack Arresting—FIGS. 6 and 8

As mentioned, FIG. 6 shows the fracture surfaces of two example joints 610, 620 after peel force has been applied. More specifically, FIG. 6 shows fractographic images illustrating effects of the present technology.

The first image 610 shows an example fractographic image of an adhesive-bonded carbon fiber composite wherein both workpieces 110, 120 lack protrusions and troughs (like that in FIG. 1). The second image 620 shows an example fractographic image of an adhesive-bonded carbon fiber composite wherein both workpieces 210, 220 include protrusions according to the present technology—e.g., $200^2$ of FIG. 2.

The first joint 610 corresponds to a conventional system like the system 100 of FIG. 1. The second joint 620 corresponds to an example joint of the present technology. Lines shown in the first joint 610 represent cracks that have propagated through the adhesive in response to peel force input.

The dots in the second joint 620 indicate protrusions 212—where they are or were. As can be seen, there are simply dimples showing in the second joint 620, corresponding to the protrusions 212, after peel force input because the protrusions 212 operated to arrest crack formation and/or propagation.

In operation, the protrusions arrest crack formation and propagation.

Figure 8:
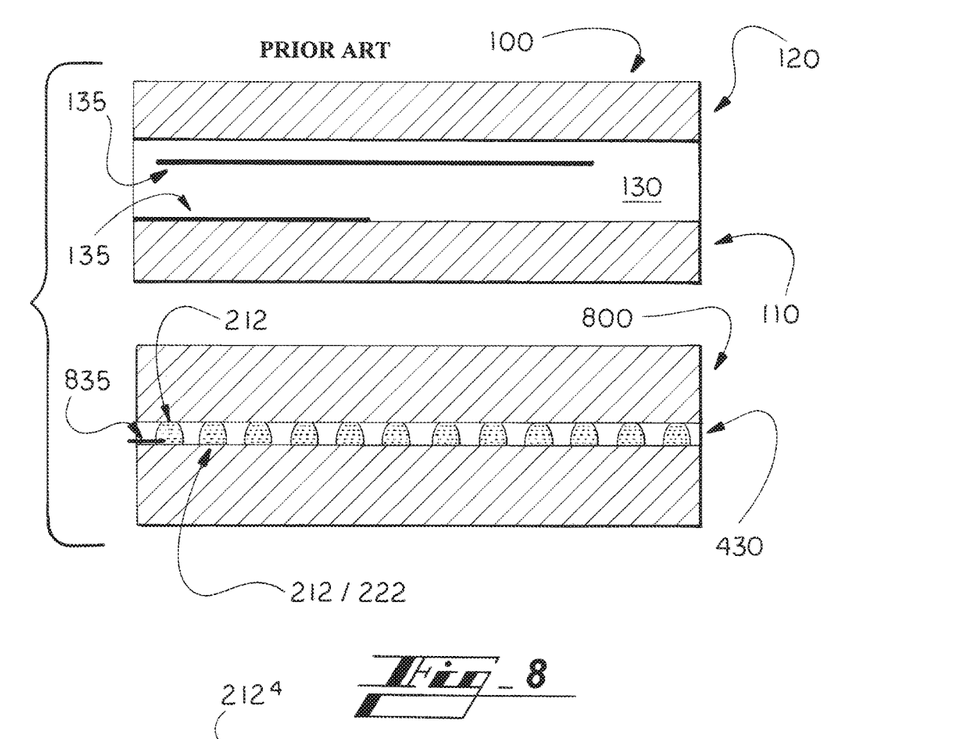
FIG. 8 shows views of a conventional joined arrangement and a joined arrangement according to the present technology and crack propagation therein.

Turning to FIG. 8, the figures show views of a conventional joined arrangement 100, like that of FIG. 1, and an example joined arrangement 800 according to the present technology and crack propagation therein. The arrangement 800 can be considered to show both of two of the possible workpiece configurations discussed above: 1. wherein only one includes protrusions 212 formed thereon; and 2. wherein both includes protrusions 212, 222—i.e., alternating protrusions of the arrangement 800 are connected originally to a first of the workpieces and the others to the second workpiece.

Cracks in the first joined arrangement 100 are indicated by reference numeral 135. As shown, they can develop in the adhesive 130 and propagate without obstruction through the adhesive 130, including possibly all the way through the adhesive 130.

Cracks in the second joined arrangement 800 are indicated by reference numeral 835. As shown, they can develop in the adhesive 430, but are arrested, such as stopped or slowed. They are arrested when they encounter one or more of the protrusions 212.

The crack 835 is arrested by the encountering for any one or more of multiple reasons. The crack 835 may stop at the protrusion 212 interface met because the force causing the cracking is insufficient to cause the crack 835 to negotiate the protrusion 212. That is, the force is insufficient to cause the crack to continue in some direction around, over, or along a surface of, the protrusion 212.

In other cases, the force causing the crack may be sufficient to cause the crack to continue even after engaging the protrusion 212, but the force is dissipated in the redirecting. The crack 835, grown by the dissipating force, does not propagate as far as it would if the dissipation was not present, or was not heightened it is due to the protrusion 212.

As an example, the crack 835 shown in FIG. 8 is shown overlapping the first protrusion 212 partially, representing the crack trying to move around the protrusion. The crack 835 stops midway around the protrusion 212 as the detour around the protrusion 212 absorbed force causing the cracking.

Joint strength is also strengthened as compared to conventional techniques (e.g., FIG. 1) because the protrusions add mechanical stability to the joint. When a force is applied to the joint—such as a sheer force, peel force, or a combination (e.g., force having multiple non-zero vectors)—the joint body is fortified by the protrusions 212 interacting with the adhesive, and adjoining protrusions. This phenomena is enhanced generally when the protrusions are distributed more densely on the workpiece 210 and/or when there are protrusions on the mating surfaces of both workpieces 210, 220.

In these ways, the load or force directing, or stress state, of the joined arrangement according to the present technology are improved as compared to conventional joined arrangements.

V. Strength Comparison Chart—FIG. 5

Figure 5:
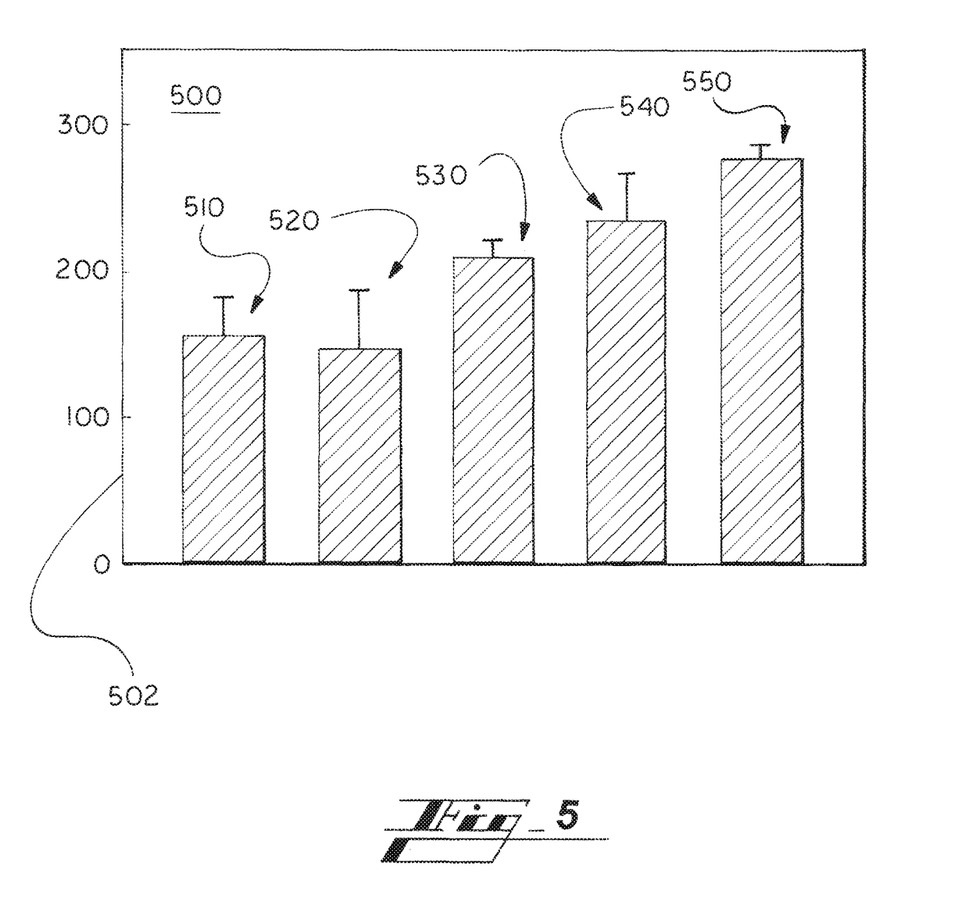
FIG. 5 shows a chart illustrating strength of various types of joints.

FIG. 5 shows a chart 500 illustrating strength of various types of joints. In particular, by way of example, the chart 500 shows results from strength tests of the bonded cross-tension carbon-fiber composite workpieces.

The y-axis 502 indicates joint strength measured in pounds (lbs.). Joint strength can be measured in any appropriate manner to compare joints formed in different ways. In one embodiment, joint strength represents the amount of force (lbs.) required to pull apart the two workpieces 210, 220, which can be referred to as peel strength.

The chart 500 shows the following five (5) joint-strength bars:

510: Both workpieces lack protrusions and troughs, and the adhesive 430 is applied to form a bond line having a thickness of about 0.25 mm;

520: Both workpieces lack protrusions and troughs, and the adhesive 430 is applied to form a bond line of about 0.5 mm;

530: One workpiece 210 has protrusions, one 220 does not, and the adhesive 430 is applied to form a bond line of about 0.25 mm;

540: One workpiece 210 has protrusions, one 220 does not, and the adhesive 430 is applied to form a bond line of about 0.5 mm; and

550: Both workpieces 210, 220 have protrusions, and the adhesive 430 is applied to form a bond line of about 0.5 mm.

As can be seen from the example test data, joint strength is increased notably when protrusions are present, on one (530, 540) or both (550) of the workpieces 210, 220, as compared to when neither workpiece has protrusions (510, 520).

As can also be seen from the example test data, joint strength is increased notably when both of the workpieces 210, 220 being joined have protrusions (550) as compared to arrangements in which neither workpiece 210, 220 has protrusions (510, 520), and further as compared to arrangements in which only one (530, 540) of the workpieces 210, 220 has protrusions 212, even considering the benefit of having a thicker bond line (0.5 mm of scenario 540 over 0.25 mm of scenario 530)

As can also be seen from the example test data, a joint formed with a thicker bond line—0.5 mm of scenario 540—is stronger than a joint formed with a thinner bond line—0.25 mm of Scenario 530.

A strength data bar for the case in which a 0.5 mm bond line is used between two workpieces having respective protrusions, but the strength is likely higher than the last shown data bar 550 in which a 0.25 mm bond line is used between two workpieces having respective protrusions.

It is contemplated that there is an optimal bond line thickness, or optimal range, specific to the implementations. Factors affecting optimal thickness or range include any one or more of materials of the substrates, thickness of the substrate, shape of the substrate, materials of the protrusions, size or shape of the protrusions, and other geometry of the joint being formed.

VI. Select Benefits of the Present Technology

Figure 7:
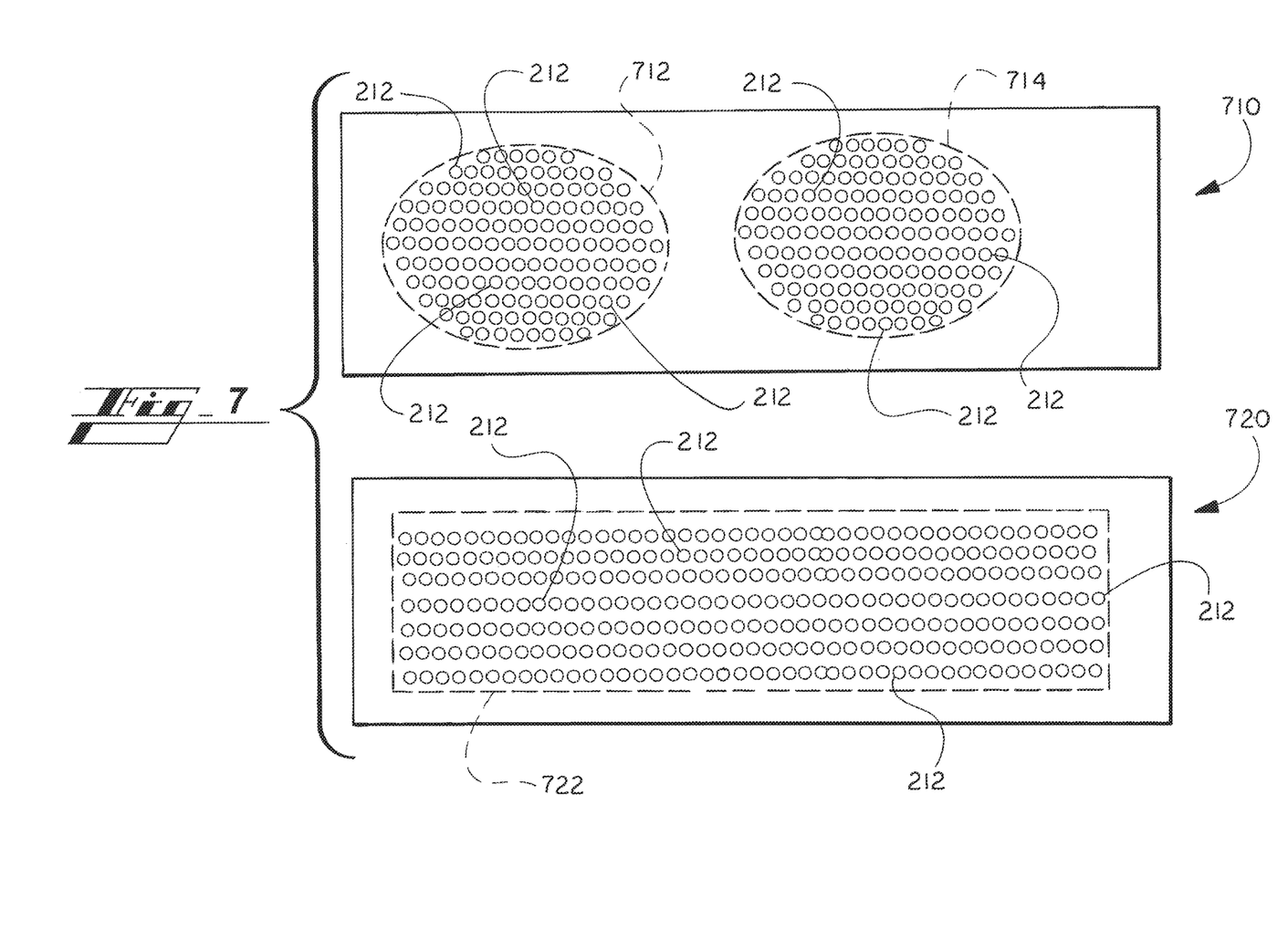
FIG. 7 shows plan views of alternative workpieces, having different example protrusion distributions according to the present technology.

FIG. 7 shows plan views of alternative workpieces 710, 720, having different example patterns or distributions of protrusions 212 according to the present technology.

The first example shows the workpiece 710 having multiple generally circular or oval distributions 712, 714 of protrusions 212. The pattern can include only one such circular or oval set of protrusions 212, two as shown, or more than two. The pattern can have other shapes, such as other rounded shapes, including rounded oblong, pear shaped, etc.

The second example shows the workpiece 720 having multiple generally rectangular or square distributions 722 of protrusions 212. Again, the pattern can have other shapes, such as other shapes having straight edges or corners, such as triangle, pentagon, hexagon, etc.

The protrusions 212 in each pattern 712, 714, 722 can be distributed in any suitable manner, such as linearly, randomly, in circular or concentric manner, in a manner that matches a boundary of the pattern 712, 714, 722, etc.

Like the protrusions 212 and any troughs (not shown in FIG. 7) need not have the same shape, they also need not all have the same size.

The shape and size of patterns 712, 714, 722 can be selected by a designer based on any of multiple relevant factors, such as space on the substrate, cost, and largely which arrangement provides the best strength characteristics for the resulting joint, such as peel strength, or peel and other (e.g., shear) strengths. For embodiments having more than one protrusion pattern 712, 714, 722, the designer can also determine preferred arranging, such as spacing between patterns 712, 714, 722 and relative positioning between patterns 712, 714, 722 based on the same or similar considerations.

VII. Select Benefits of the Present Technology

Many of the benefits and advantages of the present technology are described above. The present section restates some of those and references some others. The benefits described are not exhaustive of the benefits of the present technology.

Adhesive-based joints formed according to the present technology are more robust—e.g., increased static strength—than conventional adhesive joints. For instance, peel strength of adhesive-bonded polymeric composites according to the present technology is markedly higher than prior arrangements (e.g., FIG. 1).

Stronger joints are formed in a relatively inexpensive manner, as forming protrusions and/or troughs is relatively inexpensive. And in various implementations, generally the same amount of adhesive used in prior techniques, or less, can be used in bonding according to the present technology.

Changing the design from the prior arrangements (e.g., FIG. 1) changes stress state from peel to more of a mixed peel and shear, so that peel strength of the adhesive-bonded is improved as compared to the prior arrangements.

The present technology results in improved mechanical performance of structures in which the joined workpieces are implemented. Example structures include, but are not limited to, any of those described above, such as vehicle body panel, vehicle hood, or other vehicle component.

Improve the mechanical performance of the structures including the workpieces joined according to the present technology.

The configuration of the present technology also avoids, limits, or slows formation or propagation of cracks in the joint formed.

VIII. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

The invention claimed is:

1. An adhesive-welded-bonded component comprising:
  a first workpiece having a first substrate and a first mating surface including a plurality of protrusions, each protrusion having a first shape;
  adhesive positioned on the first mating surface; and
  a second workpiece comprising a second substrate having a second mating surface corresponding to the plurality of protrusions on the first mating surface and contacting the first mating surface and the adhesive;
  wherein the second mating surface comprises troughs receiving the protrusions of the fast workpiece; and
  wherein at least some of the protrusions include an energy director having a second shape corresponding to one of the plurality of protrusions, the energy director configured to direct welding energy, joining the protrusions to the troughs, in forming the adhesive-welded bonded component;
  wherein each of the protrusions extends directly from a first surface of the first substrate,
  wherein a bottom surface of each of the protrusions is coplanar with the first surface, and
  wherein a bottom surface of each energy director is coplanar with the bottom surface of a respective protrusion in which said each energy director is located.

2. The adhesive-welded-bonded component of claim 1 wherein the plurality of protrusions of the first workpiece and the troughs of the second workpiece are arranged in multiple mating patterns.

3. The adhesive-welded-bonded component of claim 2 wherein at least one of the patterns has a generally rounded shape.

4. The adhesive-welded-bonded component of claim 2 wherein at least one of the patterns has a generally rectangle shape.

5. The adhesive-welded-bonded component of claim 1 wherein the plurality of protrusions of the first workpiece and the troughs of the second workpiece are arranged in mating patterns selected from a group consisting of generally round and generally rectangle.

6. The adhesive-welded-bonded component of claim 1 wherein a height of each protrusion is between about 40 and about 50% of a thickness of the substrate.

7. The adhesive-welded-bonded component of claim 1 wherein each protrusion has a bulbous head shape.

8. The adhesive-welded-bonded component of claim 1 wherein each protrusion has a recessed head shape.

9. The adhesive-welded-bonded component of claim 1 wherein a height of each protrusion is between about 25% and about 50% of a thickness of the substrate.

10. The adhesive-welded-bonded component of claim 1 wherein a height of each protrusion is between about 10% and about 50% of a thickness of the substrate.

11. The adhesive-welded-bonded component of claim 1 wherein:
  the plurality of protrusions of the first workpiece is a first set of protrusions;
  the second workpiece comprises a second set of protrusions; and
  protrusions of the first set are disposed between protrusions of the second set.

12. The adhesive-welded-bonded component of claim 1 wherein the protrusions comprise material distinct from material of the substrate.

13. An adhesive-welded-bonded component comprising:
  a first workpiece having a first mating surface including a plurality of protrusions, each protrusion having a first shape;

adhesive positioned on the first mating surface; and a second workpiece having a second mating surface corresponding to the plurality of protrusions on the first mating surface and contacting the first mating surface and the adhesive;

wherein the second mating surface comprises a plurality of troughs receiving the protrusions of the first workpiece; and wherein each of the plurality of protrusions includes an energy director having a second shape, each second shape corresponding to a respective one of the plurality of protrusions, the energy director configured to direct welding energy, joining the protrusions to the troughs, in forming the adhesive-welded bonded component, wherein each of the protrusions extends directly from a first surface of the first substrate, wherein a bottom surface of each of the protrusions is coplanar with the first surface, and wherein a bottom surface of each energy director is coplanar with the bottom surface of a respective protrusion in which said each energy director is located.

14. An adhesive-welded-bonded component comprising:

a first workpiece having a first substrate and a first mating surface including a plurality of protrusions, each protrusion having a first shape;

adhesive positioned on the first mating surface; and a second workpiece comprising a second substrate having a second mating surface corresponding to the plurality of protrusions on the first mating surface and contacting the first mating surface and the adhesive;

wherein at least some of the protrusions include an energy director having a second shape corresponding to one of the plurality of protrusions, the energy director configured to direct welding energy to weld the protrusions to the second mating surface forming the adhesive-welded-bonded component, wherein each of the protrusions extends directly from a first surface of the first substrate, wherein a bottom surface of each of the protrusions is coplanar with the first surface, and wherein a bottom surface of each energy director is coplanar with the bottom surface of a respective protrusion in which said each energy director is located.

* * * * *